United States Patent Office 3,488,200
Patented Jan. 6, 1970

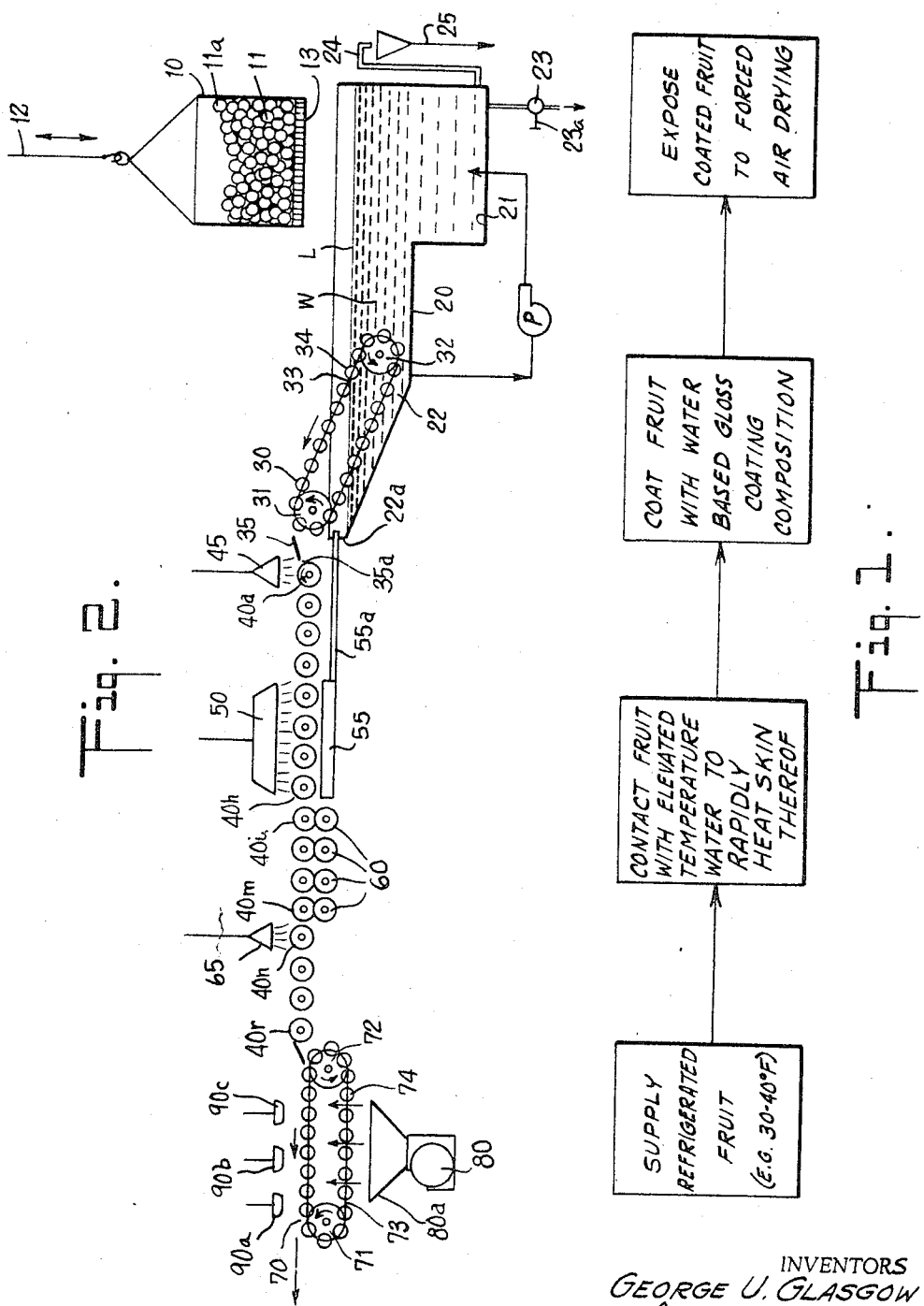

3,488,200
RAPID DRYING OF WATER BASED GLOSS COATING ON REFRIGERATED FRUIT
George U. Glasgow, Bronx, N.Y., and Albert J. Kraght, Glendora, Calif., assignors to Pennwalt Corporation, East Orange, N.J., a corporation of Pennsylvania
Filed Feb. 28, 1967, Ser. No. 619,375
Int. Cl. A23b 7/16
U.S. Cl. 99—168                           11 Claims

ABSTRACT OF THE DISCLOSURE

A process for effecting rapid drying of a water based gloss coating on refrigerated fruit (e.g. apples) despite unfavorable ambient drying conditions, and while the fruit body is maintained at refrigerated temperatures. Warm or hot water, e.g. at about 100–160° F., is applied to the refrigerated fruit (as a spray or a bath) for at least about five seconds but not so long that the core temperature of the fruit is raised more than about 15° F. (at the point in time of maximum rise). The water based gloss coating is next applied, and is rapidly dried by circulation of ambient air thereover. When water contact is practiced by spray the fruit skin may, for reasons of economy, be preheated prior to subjection to the water spray by exposure to water in the range 50–90° F. retrieved from used water spray.

BACKGROUND OF THE INVENTION

It is customary in the preparation of some fruits (e.g. apples) to coat the outer surface or skin thereof with a gloss coating that is applied as a water soluble, or dispersible resin, wax, or oil. A drying step is required to evaporate the water component and leave behind the resin, wax, or oil as the protective gloss coating.

A serious problem arises in that some fruit (e.g. apples) are refrigerated near the freezing point of water for storage. Water based gloss coating compositions dry slowly when applied to such refrigerated fruit, even when normal ambient air (e.g. 70° F.) is circulated therearound. The drying is slower when ambient is lower (e.g. 55° F.) and still slower when the relative humidity is high (e.g. 80–90%). Under some conditions of low temperature and high humidity, no drying at all occurs. This is because moisture from the air can condense on the surface of the refrigerated fruit and reverse the drying process.

The space which can be allocated to drying in the plant may be very small, so that in order to apply a gloss coating, in many cases, it is necessary that the coating be dried rapidly. The prior art teaches allowing the fruit to warm to ambient before applying the gloss coating in order to speed the drying process. But ambient may still be relatively low (e.g. 55° F.) and hence unfavorable for drying, especially at high relative humidity. Moreover, it is undesirable to allow the fruit to warm to ambient prior to gloss coating because the required subsequent additional refrigeration adds undue expense. Also, it is not good for the fruit tissue to undergo repeated temperature cycles.

The prior art also teaches the use of heat lamps to dry the coated fruit, or the blowing of hot air over the coated fruit. The air is sometimes heated to as high as 140° F. to prevent moisture from condensing on the cold fruit and reversing the drying process. However it is undesirable to produce hot air for circulation over the refrigerated fruit, or to employ radiant heat lamps as the sole sources of heat, because both are inherently expensive, as judged by the level of economy necessary in this industry. The prior art provides no process that allows the body of the fruit to remain refrigerated, yet rapidly dries the water based gloss coating economically, i.e. without inherently relatively expensive expedients, such as hot air or heat lamp employment.

BRIEF SUMMARY OF THE INVENTION

Refrigerated fruit is contacted with hot water long enough so that the skin temperature thereof is raised from the initial 30–40° F. to a warm condition, but not so long that the core temperature rise exceeds about 15° F. By core temperature rise is meant the maximum rise attributed to the water contact, and this generally does not occur until about 20 minutes after the hot water contact at the fruit surface. For example, contact, as by spraying, with water at 100–160° F. may be practiced for at least about 5 seconds until the aforesaid is attained. The fruit is then immediately coated with a water based gloss coating composition, and ambient air is circulated thereover to effect drying. Surprisingly, the hot water contact does not appreciably raise the temperature of the interior of the fruit while it is raising the temperature of the skin thereof. Also surprisingly, ambient air circulated around the fruit efficiently and rapidly dries the gloss coating despite the refrigeration of the fruit body and despite deleterious ambient drying conditions, e.g. relative humidity of 80–90% and ambient temperature of 55° F. If desired, the spent spray water may be used to heat a bath to 50–90° F., and the fruit may be preheated in this bath for from ½ to 4 minutes prior to spraying with the 100–160° F. water. The use of the present process to rapidly dry the fruit, also significantly improves the efficiency of the detergents normally used to clean the fruit prior to putting on the gloss coating.

BRIEF DESCRIPTION OF THE FIGURES

An illustrative embodiment of the invention is set forth hereinbelow in a detailed description of the invention with reference to the figures, in which:

FIG. 1 is a process diagram indicating a series of steps comprising a process in accordance with the invention; and FIG. 2 is a schematic representation, in elevation, of an apparatus adapted to carry out a process in accordance with the invention.

Referring now to the figures, the process steps set forth in FIG. 1 may be carried out by the example apparatus shown schematically in FIG. 2.

With reference to FIG. 1, the process according to the invention contemplates the supply of refrigerated fruit at or near the freezing point of water, e.g. 30–40° F. The fruit is then contacted with hot water to raise the skin temperature thereof. The skin temperature should be raised sufficiently quickly so that the interior of the fruit is raised in temperature no more than about 1–15° F., at the time of maximum rise thereof.

It has been found that a short contact with water at about 100–160° F. produces a sufficient thermal gradient so that the skin of a refrigerated fruit can be raised to the operative temperature range before the interior thereof rises beyond 15° F. over its refrigerated temperature. When preheating is not practiced, at least about 5 seconds spray contact is required, and the upper time limit of contact is the duration beyond which the core temperature would rise more than 15° F. above its refrigerated temperature. Maximum core rise does not occur immediately, and as used herein a 15° F. core rise means the maximum rise attributed to the transient skin heating (e.g. by spraying), which generally occurs about 20 minutes thereafter. The upper time limit will therefore also depend upon the nature of the fruit and the fruit tissue, the ambient temperature, and the size of the fruit, i.e. its area to volume ratio.

In the preferred form, the warm or hot water at 100–160° F. will be sprayed on the fruit in coarse droplets. The water after such form of contact is still at an elevated temperature, e.g. about 100–140° F., and it has been found desirable from an economic standpoint to utilize the additional heat value of such spent spray water by heating a bath utilized to preheat the fruit prior to the spray at 100–160° F. The preheat bath may be about 50–90° F., preferably at about 60° F. to about 90° F., and so presents a lower temperature gradient upon the fruit than does the 100–160° F. spray. Accordingly, the fruit may be exposed to this preheat bath for a more considerable period of time, preferably 0.5 minute to 4 minutes, with heating of the fruit skin to nearly the temperature of the preheat bath, without appreciable heating of the fruit interior. When the preheat bath is not employed, the duration of spray at 100–160° F. is extended or its temperature increased within the limits of 100–160° F. to attain the aforesaid skin temperature ranges, but the fruit interior temperature rise stays nearer the lower part of the 1–15° F. range. When the preheat bath is employed, the duration of the 100–160° F. spray, or its temperature within that range, may be lowered, but the fruit interior temperature will rise nearer the upper part of the 1–15° F. range. Thus, in the preheat case, because of the lower spray temperature and/or duration, economy results. Otherwise the preheating step is optional with the present invention.

After the skin temperature of the fruit is so raised, the process of FIG. 1 contemplates the immediate application of a water based gloss coating composition thereto, e.g. an alkali soluble, water soluble, or dispersible resin, wax, or oil suitable for fruit coating purposes both as to safe edibility and gloss production. Many such are known, for example 12% shellac dissolved or dispersed in water with about 4% of ammonia (29%). For another example, 12% Carnauba wax emulsified in water with 3.5% potassium oleate. Also various blends of these two compositions can make effective fruit coatings. The percentage of water in the composition will vary widely depending upon the other contents and upon the precise use conditions. These many gloss coating compositions and details of their application are known to the art. The process then contemplates the immediate circulation of air over and around the fruit. While the air so circulated may be raised (or even lowered) somewhat in temperature relative to ambient, an advantage of the invention resides in the fact that ambient air may be employed, yet the fruit will still be dried much more rapidly than possible without the step of contacting the fruit with hot water to raise the skin temperature thereof appreciably above ambient.

Because the production of hot water is so much more economical than the production of hot air or the employment of heat lamps, the present process is much more economical than prior art processes employing those expedients. Also, since the heat is introduced before the gloss coating is applied, rather than after as in such prior art processes, drying time is still further reduced despite the increased economy, because in effect drying starts earlier, i.e. almost as soon as the coating is applied. Moreover, heat transfer by water contact is more efficient and rapid than heat transfer by air contact, so that still another time lag and still another uneconomical factor is eliminated. Since the fruit is usually cleaned with detergents before application of the gloss coating, the use of the hot rinse and the increase in skin temperature results in greater efficiency in the cleaning process.

Apples are one comon example of fruits which are refrigerated for storage and shipping, and which are given a gloss coating in commercial practice. Accordingly apples will specifically be referred to herein, but it is to be understood that the invention is applicable to other fruits as well.

The temperature and relative humidity of the ambient air have an effect on the drying time of the coated fruit, as does the nature and amount of the coating composition, the size and shape and skin texture of the piece of fruit, and the velocity of the circulated air. However, these factors do not form a part of the present invention, which instead concerns itself with increasing the drying speed of refrigerated apples, given a specific set of these other factors. The process according to the invention will always enhance drying speed of coated refrigerated apples, but the benefits of the invention will be most apparent when the ambient air temperature is low, e.g. 55° F., and the ambient air relative humidity is high, e.g. 80–90%.

The following examples will illustrate the invention.

Examples I and II

Two identical 150 gram apples were provided with fruit thermometers at their cores, and refrigerated to 32° F. The ambient air was measured and found to be 55° F., 90% relative humidity. One apple was sprayed with coarse droplets of water at 120° F. for 10 seconds. The apple was immediately coated with 0.10 ml. of a water based gloss coating composition containing 12% Carnauba wax and 3.5% potassium oleate, and ambient air was immediately circulated thereover. This apple dried completely in 60 seconds. The apple with the thermometer still in place was then returned to refrigeration and the maximum rise in temperature of the core was noted. The rise continued for 20 minutes to a peak of 4° F., and then again began to decrease toward the temperature of refrigeration. The second apple was coated and circulated with air in the exact same manner as the first apple, but no hot water spray was employed, this apple being coated immediately with its skin in the refrigerated condition. At 60 seconds, this apple failed to dry at all, and in fact had increased in wetness due to condensation of ambient moisture on the cold skin. The thermometer showed a peak rise of 2° F. at the core at 20 minutes when put back into refrigeration. These examples establish the advance attributable to the invention under very adverse drying conditions.

Examples III–V

Three apples, essentially identical to the apples of Examples I and II, were similarly provided with thermometers at their cores. The ambient air was again 55° F., 90% relative humidity. Before each being sprayed for 10 seconds with water at 120° F. the apples were each preheated in an 80° F. bath. The water preheating bath was of sufficient volume so that its temperature remained substantially constant despite immersion therein of the refrigerated apples. The duration of immersion was varied with individual apples. After preheating and spraying, each apple was coated with 0.10 ml. coating composition and air circulated as in Examples I and II. The preheat time, the drying time, and the peak core rise were all noted, and are summarized in the following table:

TABLE I

| Apple No. | Preheat Time, min. | Drying Time, sec. | Core Rise, ° F. |
|---|---|---|---|
| III | 0.5 | 45 | 7.5 |
| IV | 2.0 | 15 | 13 |
| V | 4.0 | 12 | 15 |

These examples further illustrate the improvement in drying attributable to the invention, especially under adverse ambient drying conditions. They also illustrate the coordinate employment of a preheat bath with subsequent hot water spray, wherein the spray is rendered more effective in raising skin temperature and lowering drying time, while core temperature rise increases within tolerable limits, as preheat time increases.

Examples VI–XII

Six apples, essentially identical to the apples of Examples I and II, were immersed for varied periods of time in different temperature baths, prior to coating with 0.15 ml. coating composition and drying with circulated air as in Examples I and II. Ambient was somewhat less unfavorable to drying, being 55° F. and 75% relative humidity. The peak core rise was 15° F. or less in all cases. The following table summarizes the results:

TABLE II

| Apple No. | Bath Temp., °F. | Bath Time, sec. | Drying Time, sec. |
|---|---|---|---|
| VI | 100 | 180 | 20 |
| VII | 100 | 60 | 35 |
| VIII | 120 | 30 | 25 |
| IX | 120 | 10 | 50 |
| X | 138 | 15 | 20 |
| XI | 138 | 10 | 30 |
| XII | 138 | 5 | 48 |

These examples further illustrate the beneficial effect on drying time of contact with hot water, and further show the coordinate effect of time and temperature of the contacting water, e.g. 15 seconds contact with water at 138° F. giving the same degree of improvement in drying time as 180 seconds contact with water at 100° F.

Examples XIII–XVIII

Three apples, essentially identical to the apples of Examples III–V, were taken from 34° F. storage, immersed in a preheat bath at 80° F. for varied periods of time, sprayed with water at 110° or 120° F. for 10 seconds, and then coated with 0.15 ml. coating composition and circulated with air as in Examples III–V. Ambient was 55° F., 85% relative humidity. The following table indicates the results:

TABLE III

| Apple No. | Preheat Time, min. | Spray Temp., °F. | Drying Time, sec. |
|---|---|---|---|
| XIII | 0.5 | 110 | 70 |
| XIV | 2 | 110 | 45 |
| XV | 4 | 110 | 20 |
| XVI | 0.5 | 120 | 45 |
| VXII | 2 | 120 | 15 |
| XVIII | 4 | 120 | 12 |

These samples show that raising the temperature of the spray contact, even at the same duration, allows the reduction of the preheat bath contact, even at the same preheat temperature. Thus, raising the spray temperature from 110° to 120° F. allows decrease of preheat contact from 2 minutes to 0.5 minutes with no change in drying time.

Examples XIX–XXII

Five apples, each weighing about 185 grams, were taken from cold storage at 30° F. They were preheated at various times and temperatures in a preheat bath, sprayed for 10 seconds with water at various temperatures, and then coated with 0.10 ml. coating composition and circulated with air as in the previous examples. Ambient conditions were 54° F., 90% relative humidity. The following table summarizes the results:

TABLE IV

| Apple No. | Preheat Temp., °F. | Preheat Time, min. | Spray Temp., °F. | Drying Time, sec. |
|---|---|---|---|---|
| XIX | 80 | 0.5 | 120 | 25 |
| XX | 80 | 0.5 | 130 | 22 |
| XXI | 80 | 0.5 | 140 | 20 |
| XXII | 70 | 0.5 | 130 | 30 |

These examples show adequate drying times even under the extreme ambient conditions, and the worst combination of short duration of preheat and short duration of spray. Under these conditions, a preheat bath temperature of 60° F. is marginal in adequacy, but a greater duration of preheat or spray time, or spray temperature, or a combination thereof, will still produce drying times of the order of Examples XIX–XXII even with a 50° F. preheat bath.

With additional reference to FIG. 2, an example apparatus for commercially practicing the invention is shown, including a tote bin 10 carrying a load 11 of apples 11a. The tote bin 10 may be moved upwardly and downwardly in the direction indicated at the double arrow by manipulation of cable 12. Conveniently, tote bin 10 will be perforate or slotted so that water may be admitted to and drained therefrom easily, and particularly will be provided with a perforate or slotted bottom surface 13.

A dump tank 20 is provided having a deep-end portion 21 situated immediately beneath tote bin 10 and of more than sufficient depth and later dimensions to accommodate all of tote bin 10. A shallow portion 22 of dump tank 20 encloses the lower portion of an endless belt conveyor indicated generally at 30. A drain 23 is provided at the bottom of deep-end portion 21 and is provided with a valve 23a so that the dump tank 20 can be periodically flushed for cleaning. An overflow outlet is provided at 24, 25 so that a maximum liquid level can be maintained within dump tank 20 despite periodic immersion of the tote bin 10 and inflow of additional water into dump tank 20.

Dump tank 20 is filled with water W to the level L which corresponds to the uppermost level of overflow outlet 24, 25. Endless belt conveyor 30 has upper and lower drive drums 31, 32 situated so that lower drive drum 32 is submerged beneath the level L of water W in dump tank 20 and upper drive drum 31 is situated above the liquid level L and adjacent the edge 22a of dump tank shallow portion 22. One or both of drive drums 31, 32 is powered in the counterclockwise direction as indicated by the arrows in FIG. 2 so that the belt 33, carrying a series of spaced cleat-bars 34 is endlessly driven from beneath the surface of water W at drum 32 upwardly past liquid level L along the inclined path toward drum 31.

Tote bin 10 is lowered into dump tank 20 where the load of apples 11 is floated out. The empty tote bin 10 is removed vertically and replaced with another full tote bin of apples. The individual apples 11a float to the surface level L of the water W in the dump tank 20, and are floated toward conveyor 30 by a recirculating pump P which directs the dump tank water toward this conveyor, carrying the apples along in a current of water. Conveyor 30 retrieves floating apples 11a from the surface L by the action of cleat-bars 34, and deposits them at upper drive drum 31 onto a short downwardly inclined ramp 35.

Immediately adjacent a lower end 35a of ramp 35 is situated a series of horizontally disposed parallel conveyor brush-rollers 40a–40h. These brush rollers 40a–40h may conveniently be cylindrical in form and have bristles of a durable plastic material such as polyethylene. The brush rollers 40a–40h are powered to rotate in the counterclockwise direction as indicated by the arrow on one of the brush-rollers in FIG. 2. Immediately above brush-roller 40a is disposed a spray nozzle 45 adapted for the optional deposit of a fruit treating liquid downward upon the apples as they are delivered thereto from ramp 35. This liquid may for example be a fungicide, e.g. a fungicide foam such as a 2% aqueous solution of sodium ortho phenyl phenate with a foaming and cleaning agent. The liquid may instead be sprayed or dripped on without foaming, and may be for cleaning alone, or for other purposes. The brush-rollers 40a–40h act to convey the apples from right to left as viewed in FIG. 1, and also act to turn and brush them so that any such substance deposited in liquid form upon the apples will be distributed over their surface during their traverse on the brush-rollers.

Over the latter half of the brush-rollers 40a–40h in the illustrated embodiment, are disposed extended spray nozzles 50 intended to provide a more or less dense spray of coarse droplets over the entire area occupied by those latter brush-rollers. The hot water spray already referred to is applied to the apples by spray nozzles 50, which extend over a plurality of rollers. Immediately beneath spray nozzles 50, and under the brushes, is situated a catch tray 55 located above liquid level L of dump tank 20 and having a conduit line 55a adapted to drain the contents of catch tray 55 into dump tank 20.

Immediately after brush-roller 40h is provided a second series of rollers 40i–40m, which is arranged in the same fashion as are brush-rollers 40a–40h, and which are also powered in the same direction so as to move any apples deposited thereon from right to left as viewed in FIG. 2. Provision of rollers 40i–40m is made so that the wet apples may be dried of gross droplets, and accordingly in a preferred form rollers 40i–40m are sponge covered. More particularly, the surface of the rollers 40i–40m may comprise a series of toroidal sponges coaxial with the axis of rotation of the rollers. As the apples are turned and passed from roller to roller gross droplets are shaken off and surface contact between the sponges and the apples will blot off other gross droplets. Beneath the rollers 40i–40m are provided hard surfaced rollers 60 which are pressed into engagement with rollers 40i–40m so as to squeeze out any excess water carried in the sponges thereof.

Immediately after roller 40m is provided still another series of rollers, in the form of brush-rollers 40n–40r. This series of rollers is again arranged in the same fashion as has already been described for the other series of rollers, and is also powered in the same direction for movement of the apples from right to left as viewed in FIG. 2. These brush-rollers 40n–40r are specifically intended to spread a water based gloss coating composition evenly over the surface of the apples, and accordingly a preferred form of brush-roller 40n–40r includes horsehair bristles at the outer surface thereof. A spray nozzle 65 for applying a water based gloss coating composition to the apples is situated above brush-roller 40n.

Adjacent the last brush-roller 40r is an endless belt conveyor 70 which is similar in construction to endless belt conveyor 30. Endless belt conveyor 70 includes a pair of drive drums 71, 72 lying in a single horizontal plane, and an endless belt 73 including a plurality of spaced cleat-bars 74 thereon adapted to cradle apples therebetween for movement with said endless belt 73. The drive drums 71, 72 lie in a horizontal plane displaced below the plane of roller-brushes 40n–40r a sufficient distance so that the uppermost traverse of endless belt 73 and cleat-bar 74 lies slightly below the upper surfaces of rollers 40n–40r. Apples that are passed off the final brush-roller 40r are thereby transported to the endless belt 73 immediately over drive drum 72. The drive drums 71, 72 and the endless belt 73 are driven in the indicated direction so that apples deposited above drive drum 72 are transferred from left to right as viewed in FIG. 2 and when they reach drive drum 71 they may be accepted by further equipment, not forming a part of the present invention, for further processing (e.g. for grading) or for boxing or for any other purpose.

Situated below endless belt conveyor 70 are air fans 80 including outlet vents 80a adapted to pass air upwardly through the endless belt 73 along substantially its entire length so as to continually circulate air around the apples carried thereby. Located above endless belt conveyor 70 is a bank of heat lamps 90a–90c, which provide optional additional drying power for extreme service conditions by virtue of radiant heat energy applied directly to the apples carried on endless belt conveyor 70. A number of air fans can be located above the belt conveyor along with the heat lamps, instead of using an air fan or fans below the endless belt.

The apples 11a introduced by tote bin 10 will be brought in at a refrigerated temperature, e.g. 30–40° F. After the equipment has run for a short while without the introduction of apples, the spent spray water will heat the tank 20 above ambient, for example to 75° F., or the tank may have retained sufficient heat from the previous day's operation, or it may have an auxiliary heater which prevents its temperature from falling too much during the night. The movement of tote bins 10 from refrigerated storage can then commence bringing in refrigerated apples. The tank 20 water W will naturally seek an equilibrium temperature representing the balance of heat inputs and outputs, chiefly from the catch tray 55 heat input and the refrigerated apples 11a heat output. As the temperature of water W in tank 20 goes up, the required spray temperature goes down, so that the system can be adjusted by adjusting the temperature and rate of flow of spray at nozzle 50. Alternatively, the system can be adjusted by adjusting the duration of spray at nozzles 50 on the apples passing thereunder. In that case, a tendency for the water W in tank 20 to go too high in temperature can be corrected by introducing cold water into tank 20, the excess of the mixture draining off at drain 24, 25. By these means, the apples 11a can be subjected to a preheat and spray of any desired combination which is suitable for the practice of the invention. The entire preheat step can be eliminated if desired, either by allowing water W to be cooled by tthe refrigerated apples without any heating, or by receiving and feeding apples 11a to conveyor 30 other than from a water bath. The preheat bath while advantageous from the standpoint of heat economy and materials handling, is not essential to the invention.

As aforesaid, the individual apples 11a float at the surface level L of the water W in dump tank 20 and are picked out by the cleat-bars 34 of conveyor 30 to be delivered to the brush-rollers 40a–40h. The average length of time an individual apple will spend in dump tank 20 before being picked out by conveyor 30 will depend upon the size and geometry of dump tank 20, as well as the size of the load in tote bin 10 and the speed and capacity of conveyor 30, and the rate of recirculation of the water by the recirculating pump. Moreover, the length of time spent therein by a specific apple will vary from the average, e.g. with an average dwell of 2 minutes, 90% of the apples may range between ½ and 4 minutes.

As aforesaid, preheating in dump tank 20 is not essential to the invention, and is practiced only to economize on the costs of heating the hot spray water used at nozzle 50. But when employed, preheating effects the degree of final heating required at nozzle 50, and accordingly the dwell time of apples in dump tank 20 becomes a factor together with the temperature of the water in dump tank 20. However, with moderate dump tank temperatures, the range of time of immersion of the individual apples will not affect the overall process appreciably. For example, a very short dump tank 20 dwelling apple will not be heated to quite the same skin temperature range as will a very long dwelling apple, but both will, if the process variables are correctly adjusted, fall within a range as to give rapid drying of the same general time duration. On the other hand, the skin temperature cannot go beyond the dump water temperature while therein, so no problem is presented by very long dwelling apples, except core temperature rise. While core rise above 15° F. is not desired with this process, the few, if any, apples that dwell longer than four minutes in dump tank 20 and/or rise more than 15° in core temperature, can be tolerated in order to achieve the greater process economy provided by the preheat optional form of the inventive process.

What is claimed is:
1. A process for gloss coating refrigerated fruit with a water based gloss coating composition, characterized by the steps of applying the gloss coating composition to the fruit, and immediately exposing the coated fruit to air drying, the improvement comprising the step of contacting the fruit, immediately prior to the step of applying the gloss coating composition to the fruit, with hot water at a temperaure of at least 100° F. for a period of time sufficient to raise the temperature of the skin of the fruit appreciably, but not so long that the peak core temperature rise of the fruit is more than about 15° F. above the refrigerated temperature.

2. In a process for gloss coating refrigerated fruit with a water based gloss coating composition, characterized by the steps of applying the gloss coating composition to the fruit, and forcing a flow of air over the coated fruit for drying thereof, the improvement comprising the step of contacting the fruit, immediately prior to the step of applying the gloss coating composition to the fruit, with water at a temperature in the range 100–150° F. for at least about 5 seconds but not so long that the core temperature of the fruit rises more than about 15° F. above the refrigerated temperature at any time during about the first half hour after said contacting step.

3. A process according to claim 2 wherein said step of contacting the fruit with water is effected by spraying.

4. A process according to claim 2, wherein said flow of air is essentially at ambient temperature and humidity.

5. A process according to claim 1 wherein prior to a second step comprising said step of contacting said fruit with hot water at a temperature of at least 100° F., is practiced a first step comprising contacting said fruit with moderate temperature water, of about 50–90° F., for a longer period of time, in the form of a water bath.

6. A process according to claim 5 wherein said second step is effected by dropping water upon said fruit.

7. A process according to claim 5 wherein said water is dropped in droplets as water spray.

8. A process according to claim 7, wherein said water bath of said first step is kept at about 50–90° F. despite contact with said refrigerated fruit, by constantly supplying thereto the collected, partially heat spent, water droplets from said second step.

9. A process according to claim 8, wherein said second step droplets are applied to said fruit at 100–160° F.

10. A process according to claim 9, wherein said fruit contacts said water bath from about ½ to about 4 minutes, and said fruit is subjected to said water spray for a period between about 5 seconds and the duration which would cause in excess of 15° F. peak fruit core temperature rise.

11. A process according to claim 2 wherein said step of contacting the fruit with water is effected by a bath.

References Cited

UNITED STATES PATENTS

| | | | |
|---|---|---|---|
| 2,383,451 | 7/1942 | Cothran | 99—168 |
| 3,410,696 | 11/1968 | Rosenfield | 99—168 |

A. LOUIS MONACELL, Primary Examiner

ROGER B. ANDEWELT, Assistant Examiner

PO-1050
(5/69)

UNITED STATES PATENT OFFICE
CERTIFICATE OF CORRECTION

Patent No. 3,488,200      Dated January 6, 1970

Inventor(s) George U. Glasgow and Albert J. Kraght

It is certified that error appears in the above-identified patent and that said Letters Patent are hereby corrected as shown below:

Claim 2, line 8, "150°" should read -- 160° --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents